Sept. 10, 1963  B. ALEXANDER ET AL  3,103,239
CITRUS JUICE EXTRACTING MACHINE WITH
FLAVEDO-ALBEDO SEPARATING MEANS
Filed Sept. 26, 1960  3 Sheets-Sheet 1

BRUCE ALEXANDER
RICHARD A. ANDREWS
DONALD R. JAMES
*INVENTORS*

BY

ATTORNEYS

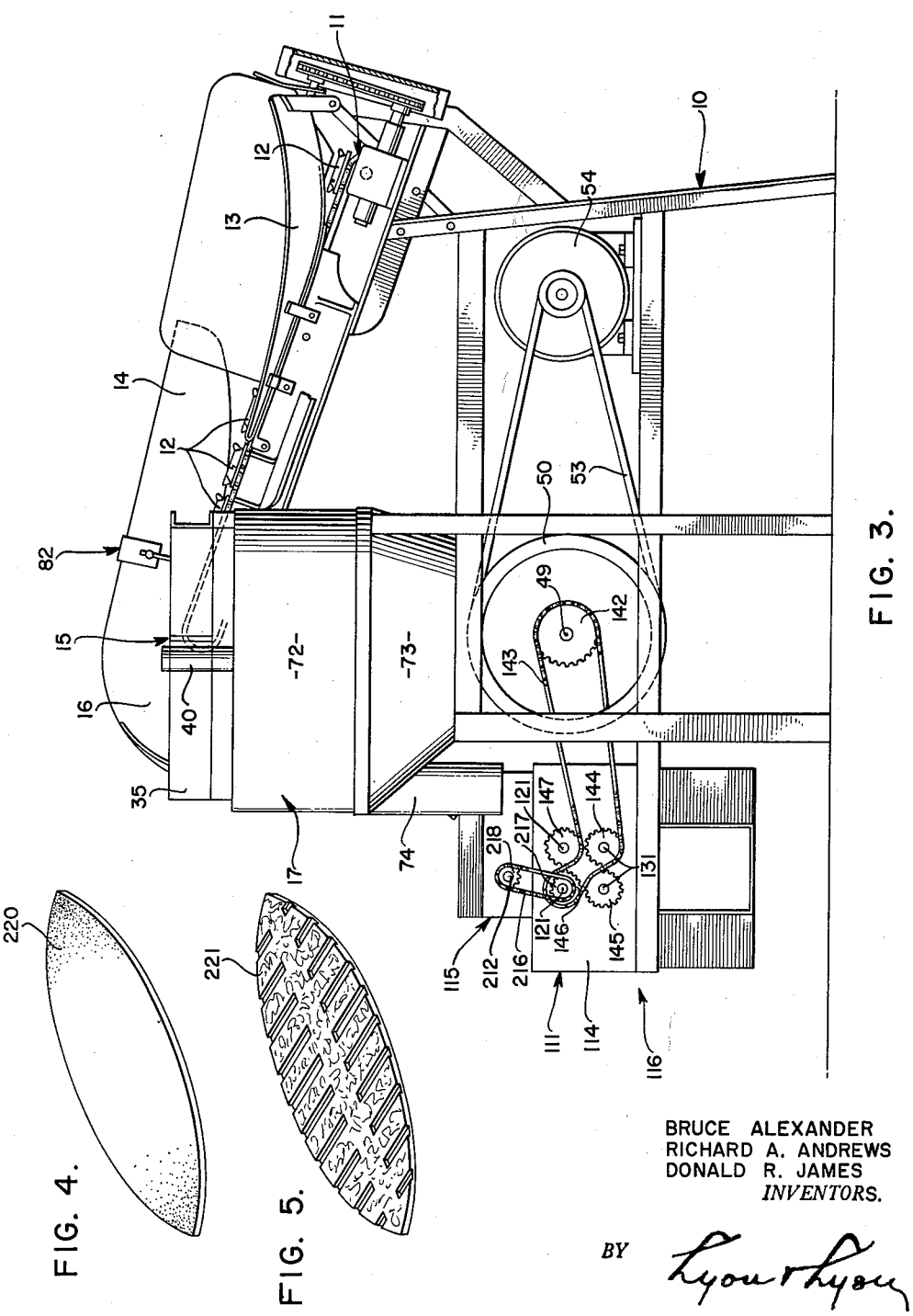

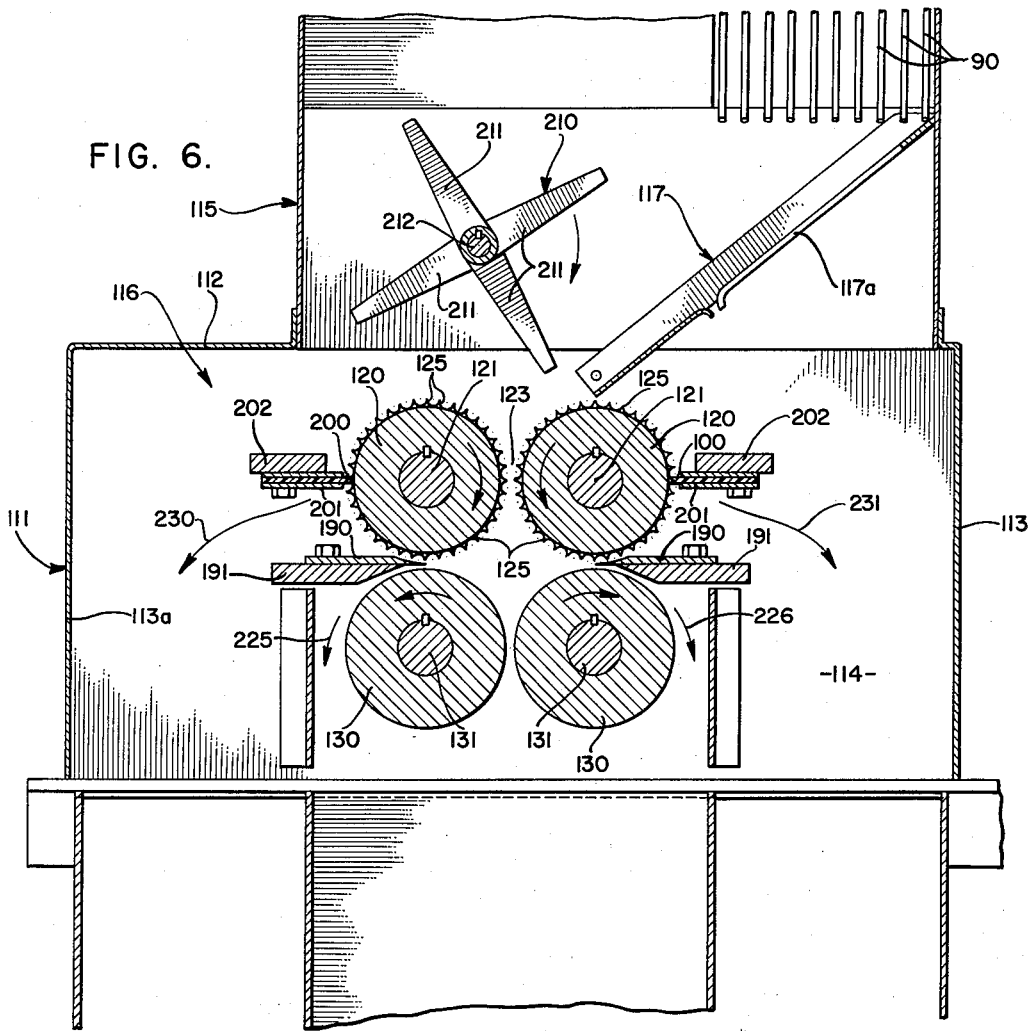
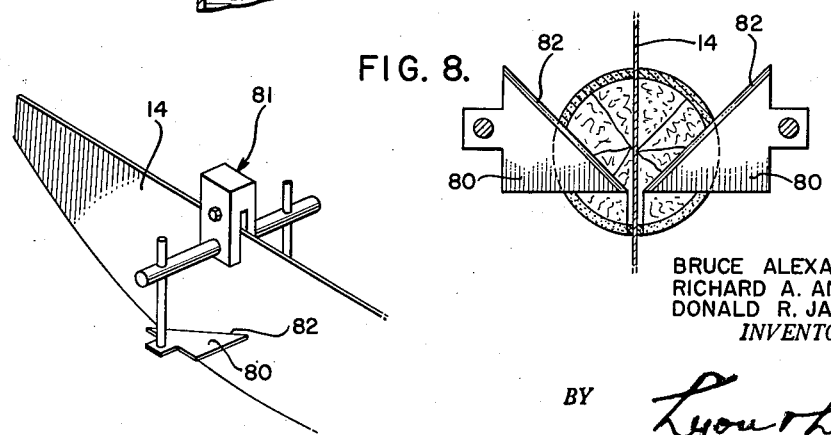

United States Patent Office 3,103,239
Patented Sept. 10, 1963

1

3,103,239
CITRUS JUICE EXTRACTING MACHINE WITH FLAVEDO-ALBEDO SEPARATING MEANS
Bruce Alexander, San Marino, Richard A. Andrews, Whittier, and Donald R. James, Covina, Calif., assignors to Brown Citrus Machinery Corporation, Whittier, Calif., a corporation of California
Filed Sept. 26, 1960, Ser. No. 58,370
3 Claims. (Cl. 146—3)

This invention relates to juice extracting machines and has particular reference to improvements in citrus juice extracting machines.

A primary object of the present invention is to provide a novel machine combining the functions of citrus juice extraction and peel oil recovery.

A further object of the present invention is to provide a machine for automatically extracting the juice and peel oil from whole citrus fruits.

Citrus juice and peel oil extracting machines have long been used in the citrus processing industry. Heretofore, the operations of citrus juice extracting and peel oil extracting or recovery have been carried out separately or if carried out in one machine, the juice and oil have been combined in the product, necessitating the use of procedures for the separation of the juice and peel oil. An important object of the present invention is to combine these operations in a single machine wherein high yields of juice and peel oil of excellent quality are simultaneously produced.

Other objects and advantages of this invention is believed will be readily apparent from the following detailed description of a preferred embodiment thereof when read in connection with the accompanying drawings.

In the drawings:

FIGURE 3 is a side elevation of the apparatus.

FIGURE 4 is a perspective view illustrating a typical flavedo layer as separated by the citrus peel oil recovery portion of the apparatus.

FIGURE 5 is a perspective view illustrating a typical albedo layer as separated by the peel oil recovery portion of the apparatus.

FIGURE 6 is a sectional elevation taken substantially on the line 6—6 of FIGURE 1.

FIGURE 7 is a fragmentary perspective view illustrating the fruit quartering apparatus.

FIGURE 8 is a fragmentary plan view of the apparatus illustrated in FIGURE 7.

Figure 1:
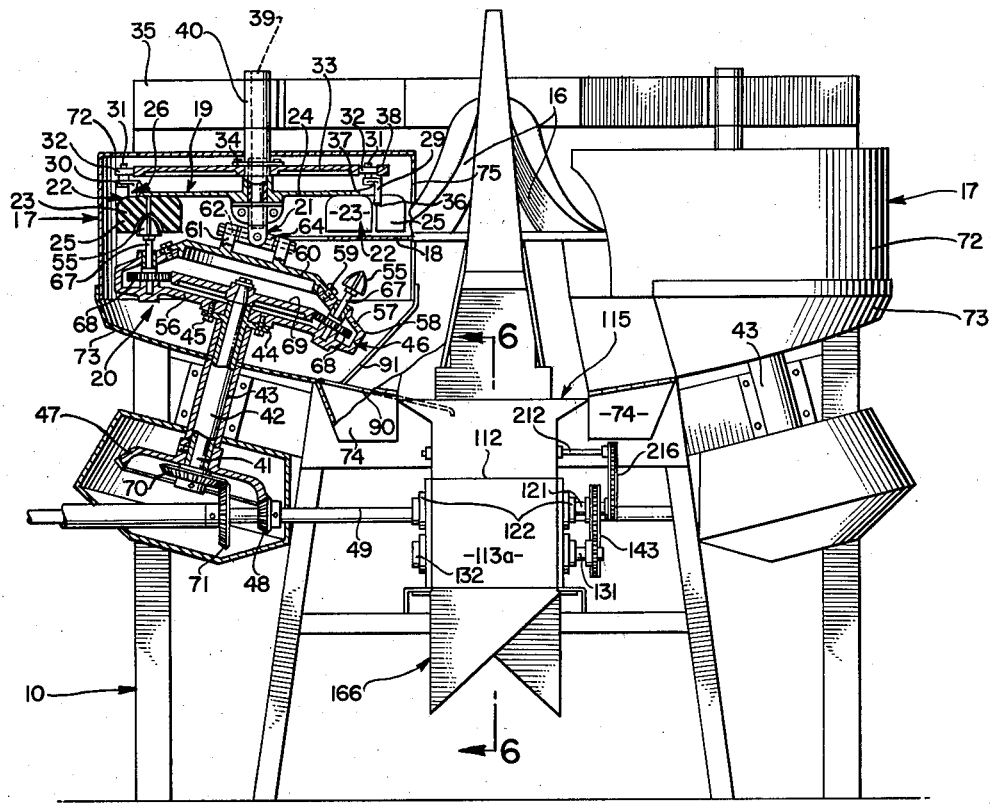
FIGURE 1 is a rear elevation, partly in vertical section, of the apparatus of the present invention.

Referring now to the drawings, and particularly FIGURE 3, the apparatus of the present invention is supported on a framework 10 and includes a conveyor 11 provided with cups 12 for conveying individual whole citrus fruit from the hopper 13 into engagement with the vertical knife blade 14 wherein the fruit is halved. The fruit halves leave the cups at 15 and are separated to freely slide across the knife blade and onto curved divider plates 16 provided with star wheels 16a, which are rotated by means (not shown) to advance the fruit from the plates 16 and which cause the fruit to be presented, cut halves downwardly, to the pair of juice extracting mechanisms 17. It is to be understood that the machine is built in duplex, one-half of the fruit going to one side of the machine and the other half to the other. As the juice extracting mechanisms on both sides of the machine are of identical construction, it is to be understood that in the following description the machine as described with respect to the handling of one-half of the fruit is duplicated on the other side of the machine for the handling of the other half of the fruit.

The divider plate 16 curves from a vertical plane at the knife 14 to a horizontal plane where it merges into a horizontal delivery platform 18 adjacent the juice extracting mechanism 17 which is substantially similar to that disclosed in U.S. Patent 2,199,876 to William O. Brown. This mechanism consists of a fruit pick-up unit generally indicated 19 mounted for rotation about a vertical axis, and reamer unit generally indicated 20 mounted for rotation about an axis inclined approximately 15° from the vertical, the two units being arranged to operate in synchronism by means of a universal connection 21.

The fruit pick-up unit includes a plurality of cups 22, of resilient material, which are formed in two halves, a fixed half 23 secured to the rotating cup carrier disc 24, and a movable half 25 hinged to the fixed half by means of the pivotal connection 26. The pivotal connection 26 consists of a pivot member 29 having a transversally extending arm 30 in which is journaled a shaft 31 carrying a roller 32 which engages a fixed cam plate 33. The pivot member is turnably supported on a pin 36 mounted on the bracket member 37 which is secured to the fixed cup half 23. The outer edge of the cam plate 33 is shaped so that as the rollers 32 travel around the plate the cups are caused to open and close to pick up and discharge the fruit halves. Positive movement of the opening of the cups is insured by cam rail 38 secured to the cam plate 33 and shaped to conform with the cam surface. The cup carrier disc 24 is keyed to a vertical shaft 39 mounted in a suitable bearing 40 on the cross bar 35. The cam plate 33 is bolted to a flange 34 secured to the bearing 40.

Exposed below the lower end of the shaft 39 and extending angularly with respect thereto, is a reamer unit driving shaft 41 mounted in a sleeve 42 which in turn is mounted in a bearing 43 supported on the framework 10. The sleeve 42 is provided with a circular flange 44 to which is attached by means of bolts 45 a circular reamer spindle carrying frame 46. The frame 46 is driven by means of a gear 47 from a gear 48 on a driveshaft 49, which shaft is driven by means of a pulley 50 mounted thereon and connected with the motor 54 by means of a belt 53.

Mounted on the frame 46 are a plurality of reamers 55, there being one reamer for each cup 22. The spindle carrying frame 46 consists of a base plate 56 having formed thereon a circular angularly disposed juice deflecting plate 57 terminating outwardly in a circular rim 58. Secured to the upper circular edge of the plate 57 by means of bolts 59 is a circular head or cap 60 which has formed integral therewith a pair of upstanding arms 61 between which is secured a shaft 62. A split yoke element is bolted to the underside of the cup carrier disc 24 and pivotally secured to a cross member 64 journaled on the shaft 62. This arrangement forms a universal joint which serves to center the cup unit and reamer unit and to maintain these members in proper relation to each other.

Figure 2:
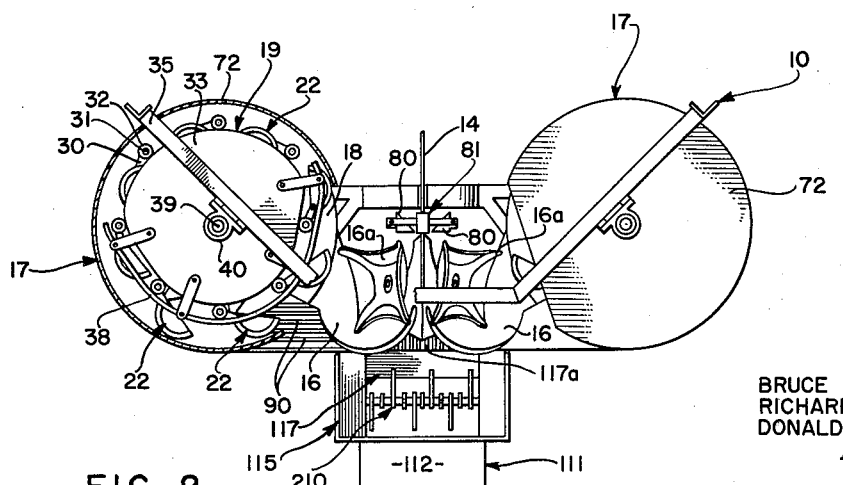
FIGURE 2 is a fragmentary top plan view of the apparatus, with the fruit delivery conveyor and associated mechanism removed for purposes of clarity.

The reamers 55 are mounted on spindles 67, each of which has its lower end journaled in the plate 56 and extends upwardly through a bushing in the deflector plate. The position of the reamers 55 is such that the reamer on the high side of the spindle carrying frame is within one of the cups as shown on FIGURE 2. For the purpose of rotating the reamers, each reamer spindle 67 is provided with a gear 68 which meshes with a gear 69 secured to the end of shaft 41. The shaft 41 is driven by a gear 70 which meshes with and is driven by a gear 71 on driving shaft 49.

The fruit pick-up unit and the reamer unit are enclosed in a casing 72, the lower portion of which forms a pan 73 to catch the juice from which the collected juice flows by means of a drain chute 74 to a receptacle (not shown). The casing is cut away as at 75 to permit entry of the fruit above the horizontal platform 18.

Means are provided for slitting the peel halves in an axial plane perpendicular to the cut faces thereof, and as shown in FIGURES 1, 2, 7 and 8, these means may include a pair of auxiliary knives 80, one adjustably mounted on either side of the vertical knife blade 14 by means of a bracket assembly 81. The cutting edges 82 of the knives are inclined at an angle of about 45° to the plane of the blade 14 in the direction of the path of travel of the fruit, and the edges 82 extend short of actual contact with, but closely adjacent to, the blade 14. Thus, as the fruit is conveyed to the knife blade 14 by the cups 12, it is halved by the blade and, while still being conveyed by the cups, the fruit halves come into contact with the knives 80, which slit the major portion of the halves, each half now consisting essentially of two quarters connected together by a narrow portion of peel (and the meat of the fruit) on either side of the cut face thereof.

A grid composed of wires 90 (see FIGURES 1 and 3) is provided to separate the peel from the extracted juice, the grid being positioned in an opening 91 in the pan 73 immediately above the outwardly flared top portions of the hopper 115 of the peel oil recovery unit generally indicated 116, which is secured to the framework 10.

The operation of the pick-up and reaming portions of the machine is as follows: The fruit half, in the axially slit condition described above, is picked up from the horizontal delivery platform 18 by a cup 22 which, as it passes over the platform, is completed open. The cup, having received the half of fruit, closes thereupon by reason of the roller 32 on the cup engaging the cam plate 33, and when the fruit is firmly engaged by the cup it passes beyond the end of the platform 18. At this point the reamer 55 associated with the particular cup holding the fruit starts to enter the fruit. The path of travel of the reamers being angularly disposed with relation to the horizontal travel of the cups, the continued circular movement of the reamers and there associated cups causes the reamer to enter the fruit into the cup. Due to the resulting squeezing action and to the rotation of the reamers with respect to the cups, the juice is extracted from the fruit and is delivered, by gravity, to the pan 73. The continued circular movement of the reamers and cups causes the reamers to move out of the cups, and at the same time the cam action causes the cups to open to discharge the peel of the fruit therefrom. The opened cup then proceeds to pick up another fruit half, as described above. During the squeezing and reaming operation, the peel portions or bonds which hold the slit halves together are broken, so that the discharged peel is in the form of peel quarters, rather than halves.

The peel oil recovery unit 116 includes a generally rectangular housing 111 having a top wall 112, front and back walls 113 and 113a and side walls 114. Gravity feed means are provided, constituting the hopper 115 which is secured to the housing and extends down through the top wall 112, the hopper being provided with a pivoted chute wall 117 including grid wires 117a.

Mounted directly below the bottom opening in the hopper is a pair of rollers or drums 120, each drum being mounted on a horizontal shaft 121 extending lengthwise of the frame and journaled at each end in bearing members 122. The drums 120 are mutually parallel and spaced apart to form a narrow bite 123, the normal spacing between the outermost peripheral surfaces of the drums being about one-half of the thickness of the peel to be operated upon. The cylindrical surfaces of the drums are provided with a plurality of circumferentially spaced, parallel ribs 125, preferably axially aligned as shown. A number of sets of ribs are provided, adjacent sets being spaced apart to provide a plurality of circumferential grooves (not shown).

A second pair of rollers 130, preferably having smooth cylindrical surfaces, is mounted directly below the rollers 120, each roller 130 being carried on a shaft 131 suitably journaled in a bearing member 132. The rollers 30 are each closely spaced from the adjacent roller 120, the spacing being approximately the same as that between the rollers 120.

Drive means are provided for the two pairs of rollers and as shown in the drawings these means may include the motor 54. The driveshaft 49 carries a sprocket 142 for engagement with the transmission chain 143 extending to a sprocket 144 on one of the shafts 131, thence to a sprocket 145 on the other shaft 131, thence around a sprocket 146 on one of the shafts 121, thence to a sprocket 147 on the other shaft 121 and back to the sprocket 142. Thus the rollers 120 and 130 are caused to rotate in the directions of the arrows of FIGURE 6.

Means (not shown) may be provided for adjusting the spacing between the rollers 120 and between each roller of each pair of rollers 120 and 130.

Knife means are provided for shaving the citrus peel segments or quarters and, as shown in the drawings, these means may include the pair of horizontal knife blades 190, mounted on knife holders 191, one suitably mounted on the framework on either side of the pairs of rollers, the cutting edge of each blade extending into the discharge portion of the bite between the adjacent rollers 120 and 130 and nearly to the center line of the rollers.

Means are provided for stripping the albedo from the rollers 120 and, as shown in the drawings, these means may include a plurality of finger members 200, each of which extends into one of the circumferential grooves. The fingers are a part of a pair of comb-like members 201, one mounted on a frame member 202 on either side of the pair of rollers 120.

Means are provided in the hopper for clearing peel jams adjacent the inlet portion of the bite between the rollers 120. As shown in the drawings these means may include an agitator or kick-off mechanism 210, comprising a plurality of paddle-like members 211 extending raidally outwardly from a shaft 212. The shaft 212 is preferably mounted on suitable bearings (not shown) to one side of a vertical plane bisecting the bite between the rollers 120, the outer most tips of the paddles 211 extending into close proximity with one of the rollers 120 and the side wall of the hopper. The mechanism 210 is rotated at a speed somewhat less then that of the rollers 130 in the direction of the arrow of FIGURE 6 by means of a chain 216 extending from a sprocket 217 on one of the shafts 121 to a sprocket 218 on the shaft 212.

In operation of the peel oil recovery unit 116, the peel quarters from the pick-up and reaming portions of the machine slide down the chute 117 and are drawn into the bite 123, the albedo portions thereof being impaled by the ribs 125 of the particular roller 120 faced by the albedo. The roller thus grips the peel and conveys it to the knife plate 190 which cleanly separates the peel along a plane parallel to the upper and lower surfaces thereof. Depending upon the adjustment of the rollers 120 and 130, the peel is separated into the flavedo layer 220 and albedo layer 221, as indicated in FIGURES 7 and 8, or the flavedo and albedo layers are left intact, being separated as such from the rag portion of the peel. In the first case, the flavedo falls in the direction of the arrow 225 or 226 of FIGURE 6 (depending upon which roller 120 the particular peel was impaled), and the albedo is stripped from its roller 120 by the fingers 200 and falls in the direction of the arrows 230 or 231. The flavedo layers thus separated, which contain the valuable peel oil, are then subjected to any suitable pressing or other operation to extract the oil therefrom. In the second case, the rag-free peel is ready for delivery to the processors of glace fruit.

It will be understood that no orientation of the peel is necessary with the peel oil extraction apparatus of the present invention. That is, the peels are fed to the hopper in random distribution from both sides of the citrus juice extracting portion of the machine, the rollers 120 selectively gripping peel portions depending upon the disposition of the portions as they enter the bite 123. This is made possible by the fact that the ribs 125 dig or bite into only the relatively soft albedo and not the relatively tough flavedo. Therefore, due to the random disposition of the peel, over a long running period, roughly one-half of the total amount of peel segments will be processed on each of the two rollers 120. It has been found in actual practice that the apparatus is highly selective, 95% or more of the peel segments being properly fed to the knife blades 190.

The mechanism 210 automatically cleans the hopper of any accidental pile up of peel. Occasionally a peel segment will bridge the bit 123, concave side down, blocking further feeding of segments into that portion of the bite. In such event, the paddle members 211 immediately kick-off or remove the inteferring quarter or segments, conveying them around the interior of the hopper to be re-fed to the bite 123.

The apparatus of the present invention, although of extremely compact dimensions, is capable of very high production rates to produce a high quality citrus juice and a high quality citrus peel oil. For example, a peel oil recovery unit only 15" wide (approximate roller length) has a capacity of 5–10 tons or more of peel per hour.

Having fully described the invention it is to be understood that it is not to be limited to the details set forth above, but the invention is of the full scope of the appended claims.

We claim:
1. A combined citrus fruit juice and peel oil extracting machine comprising the combination of a frame; means on said frame for cutting citrus fruit into halves; means on said frame for slitting the fruit peel halves on planes substantially normal to the cut faces thereof to produce substantially peel quarters; means on said frame for extracting the juice from the fruit; grid means on said frame for separating the extracted juice from the substantially peel quarters; means on said frame for separating the oil-bearing portions of the peel from the remainder thereof, said means comprising a pair of substantially parallel rolls, said rolls having lonigtudinally extending ribs on their surfaces, said rolls being spaced apart a distance such that the distance between the outer ends of opposed ribs is equal to at least half of the thickness of the peel being fed between said rolls, whereby citrus peel fed in random orientation between said rolls is selectively gripped by the ribs of one of said rolls with the albedo portion of the peel facing said roll, the peel being diverted in one direction or the other, depending upon the disposition of the albedo and flavedo portions of said peel relative to said roll as the peel passes therebetween; means cooperating with each of said ribbed rolls for guiding the diverted peel in said direction, said cooperating means comprising a pair of feeding rolls located below said ribbed rolls, each one of said lower rolls forming a bite with a corresponding one of said ribbed rolls, the rolls of said lower pair being speced from each other, each of said lower rolls being spaced from said corresponding roll of said pair of ribbed rolls substantially uniform distances, said distances being substantially the same as that between the rolls of said pair of ribbed rolls; drive means for rotating said ribbed rolls in opposite directions with the opposed adjacent surfaces thereof moving downwardly; means for rotating said lower rolls in opposite directions with the opposed adjacent surfaces thereof moving upwardly; a shaving knife mounted on the outside of and adjacent the bite between each pair of ribbed rolls and lower rolls to shave peel passed between said bite; and gravity feed means for feeding the substantially peel quarters from said grid means to said ribbed rolls in random orientation.

2. The apparatus of claim 1, including means for removing shaved peel from the ribbed rolls.

3. The apparatus of claim 2, wherein the means for halving the fruit includes a vertical knife blade, wherein the means for slitting the peel includes an auxiliary knife mounted adjacent the vertical knife blade and having a cutting edge generally perpendicular to the vertical knife blade but slightly spaced therefrom so that a fruit half conveyed across said vertical knife blade is slit in an axial plane generally perpendicular to the cut face of the fruit half, the slit forming essentially two quarters of the fruit half connected together by small portions of the peel, wherein the means for extracting the juice from the fruit comprises a cooperating cup and reamer assembly, and wherein the reamer presses the fruit half in said cup to remove the juice and to break apart the two peel quarters.

References Cited in the file of this patent
UNITED STATES PATENTS

| | | |
|---|---|---|
| 2,208,787 | Brown | July 23, 1940 |
| 2,212,066 | Fry | Aug. 20, 1940 |
| 2,477,289 | De Moss | July 26, 1949 |
| 2,848,025 | Harden et al. | Aug. 19, 1958 |